United States Patent
Bertin et al.

(12)

(10) Patent No.: US 6,255,422 B1
(45) Date of Patent: Jul. 3, 2001

(54) POLYMERIZATION IN THE PRESENCE OF A STABLE FREE RADICAL AND OF AN INIFERTER

(75) Inventors: Denis Bertin, Motteville; Bernard Boutevin, Montpellier; Pascal Nicol, Pau, all of (FR)

(73) Assignee: ATOFINA (FR)

( * ) Notice: Subject to any disclaimer, the term of this patent is extended or adjusted under 35 U.S.C. 154(b) by 0 days.

(21) Appl. No.: 08/974,091

(22) Filed: Nov. 19, 1997

(30) Foreign Application Priority Data

Nov. 20, 1996 (KR) .................................. 96 14147

(51) Int. Cl.[7] .................................. C08F 2/48; C08F 2/00
(52) U.S. Cl. ......................... 526/220; 522/17; 526/204; 526/223
(58) Field of Search .............................. 522/17; 526/204, 526/193, 217, 201, 211, 220, 244, 223

(56) References Cited

U.S. PATENT DOCUMENTS

| | | |
|---|---|---|
| 2,813,849 | 11/1957 | Kern . |
| 5,189,112 | 2/1993 | Clouet . |
| 5,200,545 | 4/1993 | Clouet et al. . |
| 5,288,808 | 2/1994 | Clouet . |
| 5,489,654 | 2/1996 | Clouet . |
| 5,658,986 | 8/1997 | Clouet . |

FOREIGN PATENT DOCUMENTS

| | | |
|---|---|---|
| 304404 | 3/1955 | (DE) . |
| 0 338 918 | 10/1989 | (EP) . |
| 0 342 073 | 11/1989 | (EP) . |
| 0 418 118 | 3/1991 | (EP) . |
| 0 507 036 A1 | 10/1992 | (EP) . |
| 0 726 280 A1 | 8/1996 | (EP) . |
| 0 807 640 A1 | 11/1997 | (EP) . |
| WO 94/11412 | 5/1994 | (WO) . |
| WO 95/26987 | 10/1995 | (WO) . |
| WO 97/46593 | 12/1997 | (WO) . |

OTHER PUBLICATIONS

C.P.Reghunadhan Nair, et al. "Application of Thermal Iniferters in Free Radical Polymerization: A New Trend in Macromolecular Engineering", Macroiniferters, Ch. 11, pp. 431–470, 1994.

Takayuki Otsu et al. "Features of Living Radical Polymerization of Vinyl Monomers in Homogeneous System Using, N,N–Diethyldithiocarbamate Derivatives as Photoiniferters", Eur. Polym. J., vol. 31, No. 1, pp. 67–78, 1995.

Toru Doi, et al. "Elucidation of Mechanism for Living Radical Polymerization of Styrene with N,N–diethyldithiocarbamate Derivatives as Iniferters by the Use of Spin Trapping Technique", J. Polymer Science: part A: Polymer Chem., vol. 32, pp. 2241–2249, 1994.

Toru Doi, et al. "Radical Polymerication of Methyl Acrylate by Use of Benzyl N,N–diethyldithiocarbamate in Combination with Tetraethylthiuram Disulfide as a Two–Component Iniferter", J. Polymer Science: part A: Polymer Chem., vol. 32, pp. 2911–2918, 1994.

U.S. patent application No. 08/597,231 (which is corresponding to EP 0726280 cited in our IDS filed Sep. 28, 1999).

U.S. patent application No. 09/000,463 (which is corresponding to WO 97/46593 cited in our IDS filed Sep. 28, 1999).

U.S. patent application No. 08/853,240 (which is corresponding to EP 0807640 cited in our IDS filed Sep. 28, 1999).

*Primary Examiner*—Christopher Henderson
(74) *Attorney, Agent, or Firm*—Pennie & Edmonds LLP

(57) ABSTRACT

The invention relates to a process for the polymerization or copolymerization of at least one monomer which can be polymerized or copolymerized by the radical route in the presence of a stable free radical and of an iniferter.

The presence of the stable free radical greatly modifies the behavior of the iniferter during the polymerization or copolymerization, so that undesirable reactions are much reduced. It is possible, rapidly and with a high yield, to polymerize or copolymerize in the presence of an iniferter in order to result in a polymer or copolymer with a reduced polydispersity and with a monomodal molecular mass distribution.

14 Claims, No Drawings

POLYMERIZATION IN THE PRESENCE OF A STABLE FREE RADICAL AND OF AN INIFERTER

POLYMERIZATION IN THE PRESENCE OF A STABLE FREE RADICAL AND OF AN INIFERTER

TABLE OF CONTENTS

| | | PAGE |
|---|---|---|
| 1. | Background Of The Invention | 2 |
| | 1.1 Technical Field | 2 |
| | 1.2 Description Of Related Art | 2 |
| 2. | Summary Of The Invention | 4 |
| 3. | Description Of The Preferred Embodiments | 5 |
| 4. | Claims | 17 |
| 5. | Abstract Of The Disclosure | 20 |
| 6. | Declaration And Power Of Attorney | 21 |

1. BACKGROUND OF THE INVENTION

1.1 Technical Field

The present invention relates to a process for the polymerization or copolymerization of at least one monomer which can be polymerized or copolymerized by the radical route in the presence of a stable free radical and of an iniferter.

1.2 Description of Related Art

An iniferter is a molecule which generates free radicals by decomposition, wherein the said free radical is able to initiate a polymerization or copolymerization, promote transfer reactions particularly of the said iniferter, and promote termination reactions. An iniferter is characterized by the following reactions involved in polymerization:

formation of free radicals from an iniferter:

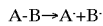  (1)

initiation and polymerization:

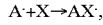  (2)

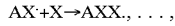

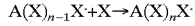

transfer reaction involving the said iniferter:

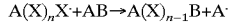  (3)

termination reaction involving a free radical generated from the said iniferter:

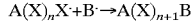  (4)

In reactions (1) to (4), A-B represents an iniferter; X represents a monomer polymerized through the radical route; n is a non-zero integer.

It is accepted by a person skilled in the art that reactions (1) to (4) characterize iniferters. Reactions (3) and (4) result in short chain formation. Therefore, according to the prior art, iniferters have been only useful in the preparation of oligomers.

When an iniferter is used in a polymerization or copolymerization reaction at a temperature where the reaction would take place and proceed to a substantial extent even in the absence of an iniferter or initiator, polymers or copolymers are obtained with broad and bimodal molecular mass distribution comprising mainly two groups of molecules distinct in molecular mass. The presence of the low molecular mass group is caused by the iniferter, and particularly, through reactions (3) and (4). The production of polymers or copolymers with a bimodal molecular mass distribution is not generally desired because of, for example, the interior heterogeneities which affect the mechanical properties of the final material.

In the prior art, for this reason, an iniferter can only be used at a temperature generally less than 100° C., at which no polymerization would take place and proceed to a substantial extent in the absence of iniferter or other polymerization initiators. Accordingly, an iniferter can only be used in the preparation of oligomers, for example, of polymers with an average molecular mass of less than 10,000. An iniferter should therefore not be confused with a conventional polymerization initiator such as azobisisobutyronitrile, benzoyl peroxide, or dicumyl peroxide. Conventional initiators do not generate the reactions (3) and (4), and therefore, do not result in the formation of polymers or copolymers with a bimodal molecular mass distribution, even at a temperature wherein polymerization or copolymerization would take place and proceed to a substantial extent in the absence of any initiators.

Patent Application WO 94/11412 illustrates the action of stable free radicals on the polymerization of styrene. U.S. Pat. No. 5,412,047 illustrates the action of stable free radicals on the polymerization of acrylates. U.S. Pat. No. 5,449,724 illustrates the action of stable free radicals on the polymerization of ethylene. The following references may also be of interest: WO 95/26987, U.S. Pat. No. 4,581,429, EP 507 036, EP 418 118, EP 342 073 or EP 338,918.

2. SUMMARY OF THE INVENTION

The present invention relates to a process for the polymerization or copolymerization of at least one monomer which can be polymerized or copolymerized by the radical route in the presence of a stable free radical and of an iniferter.

The presence of the stable free radical greatly modifies the behavior of an iniferter during a polymerization or copolymerization so that the undesirable reactions (3) and (4) are greatly reduced, and indeed, eliminated. It is thus possible to polymerize or copolymerize rapidly and with a high yield in the presence of an iniferter. Furthermore, it is possible to result in a polymer or copolymer with monomodal molecular mass distribution and a reduced polydispersity in the presence of an iniferter, even if the polymerization or copolymerization is carried out at a temperature at which the reaction would be observed in the absence of an iniferter or initiator.

The invention is particularly advantageous in the context of the polymerization or copolymerization of methacrylates, whose polymerization or copolymerization is especially difficult as taught in WO 94/11412.

3. DETAILED DESCRIPTION OF PREFERRED EMBODIMENTS

Preferred embodiments of the present invention will be described as follows.

According to the present invention, it is possible to choose an iniferter capable of splitting into two free radicals under the effect of ultraviolet radiation. For example, an iniferter comprises a single covalent bond involving two sulphur atoms (disulphide linkage), wherein the said iniferter is capable of breaking into two free radicals by the cleavage of the said bond, in accordance with the reaction (1), with each sulphur atom carrying an additional electron characteristic of the free radical state.

The iniferter can, for example, be represented by the formula

wherein the $R^1$ and $R^2$ groups, which can be identical or different, represent radicals which can be highly varied in nature and which generally comprise at least one carbon atom. For example, the $R^1$ and $R^2$ groups can be chosen from alkyl, aryl, aralkyl or alkylaryl radicals comprising, for example, from 1 to 30 carbon atoms, thiuram radicals of formula

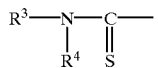

xanthate radicals of formula

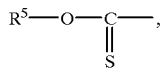

carbamoyl radicals of formula

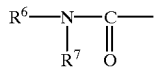

in which $R^3$, $R^4$, $R^5$, $R^6$ and $R^7$ can, for example, be chosen from alkyl, aryl, aralkyl or alkylaryl radicals comprising, for example, from 1 to 30 carbon atoms.

Examples of iniferters are given in Patent Applications EP 507,036, EP 418,118, EP 342,073, and EP 338,918. The iniferter can also be chosen from the following list:

tetraethylthiuram disulphide,
tetramethylthiuram disulphide,
N,N'-diethyl-N,N'-bis(2-hydroxyethyl)thiuram disulphide,
N,N'-bis(N-(2-phthalimidoethyl)piperazine-thiuram disulphide,
diisopropyl xanthate disulphide.

The iniferter can be introduced into the polymerization or copolymerization mixture in the proportion of 0.001% to 15% of the sum of the moles of monomer and iniferter.

The process, according to the present invention, involves a stable free radical.

A stable free radical should not be confused with free radicals with a fleeting lifetime (a few milliseconds) resulting from the usual polymerization initiators such as peroxides, hydroperoxides and initiators of azo type. Free radicals of polymerization initiators tend to accelerate the polymerization. In contrast, stable free radicals generally tend to slow down the polymerization. In the present invention, a free radical is generally said to be stable if it is not a polymerization initiator and if, under the conditions of use of the present invention, its mean lifetime is at least five minutes. During this mean lifetime, the molecules of the stable free radical continually alternate between the radical state and the state of bonded in a group via a covalent bond to a polymer chain. It is preferable for the stable free radical to exhibit good stability throughout the duration of its use in the context of the present invention. Generally, a stable free radical can be isolated in the radical state at room temperature.

The family of the stable free radicals includes compounds acting as radical polymerization inhibitors, stable nitroxide radicals comprising the =N—O. group, such as the radicals represented by the following formulae:

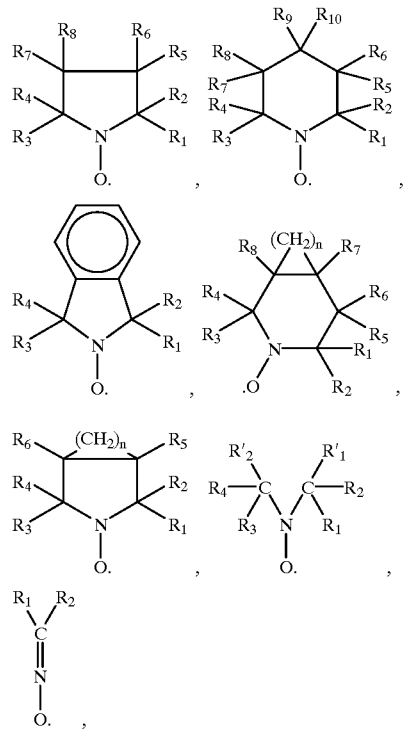

wherein $R_1$, $R_2$, $R_3$, $R_4$, $R'_1$, and $R'_2$, which can be identical or different, represent a halogen atom, such as chlorine, bromine or iodine, or a saturated or unsaturated, linear, branched or cyclic hydrocarbon group, such as an alkyl or phenyl radical, or an ester group —COOR or an alkoxy group —OR, or a phosphonate group —PO(OR)$_2$, or a polymer chain which can be, for example, a poly(methyl methacrylate) chain, a polybutadiene chain or a polyolefin chain, such as a polyethylene or polypropylene chain, but preferably a polystyrene chain; and wherein $R_5$, $R_6$, $R_7$, $R_8$, $R_9$ and $R_{10}$, which can be identical or different, can be chosen from the same family of groups as just envisaged for $R_1$, $R_2$, $R_3$, $R_4$, $R_1$ and $R_2$, or a hydrogen atom, or a hydroxyl group —OH, or an acid group such as —COOH or —PO(OH)$_2$ or —SO$_3$H.

In particular, the stable free radical can be 2,2,5,5-tetramethyl-1-pyrrolidinyloxy, sold under the trade name Proxyl; or 2,2,6,6-tetramethyl-1-piperidyloxy, generally sold under the name Tempo.

The stable free radical can also be chosen from the following list:
N-tert-butyl-1-phenyl-2-methylpropyl nitroxide,
N-tert-butyl-1-(2-naphthyl)-2-methylpropyl nitroxide,
N-tert-butyl-1-diethylphosphono-2,2-dimethylpropyl nitroxide,
N-tert-butyl-1-dibenzylphosphono-2,2-dimethylpropyl nitroxide, N-phenyl-1-diethylphosphono-2,2-dimethylpropyl nitroxide, N-phenyl-1-diethylphosphono-1-methylethyl nitroxide, N-(1-phenyl-2-methylpropyl)1-diethyl-phosphono-1-methylethyl nitroxide.

The stable free radical can be introduced into the polymerization or copolymerization mixture in the proportion of 0.005 mol % to 4 mol % of the sum of moles of monomer and stable free radical.

The molar ratio of the stable free radical to the iniferter preferably ranges from 0.2 to 5, and more preferably, from 0.5 to 3.

In the context of the present invention, any monomer exhibiting a carbon-carbon double bond capable of polymerizing or copolymerizing by the radical route can be used.

At least one monomer present in the polymerization or copolymerization mixture can be a vinylaromatic monomer, or an olefin, or a diene, or a (meth)acrylic monomer. The monomer can also be vinylidene difluoride or vinyl chloride.

Vinylaromatic monomer is understood to mean styrene, substituted styrene, for example, substituted on the vinyl group by an alkyl group, such as α-methylstyrene, or substituted on the ring, such as ortho-vinyltoluene, para-vinyltoluene, ortho-ethylstyrene or 2,4-dimethylstyrene, or substituted on the ring by a halogen, such as, 2,4-dichlorostyrene, vinylanthracene, chloromethylstyrene or para-acetoxystyrene.

Diene is understood to mean in particular a conjugated diene comprising from 4 to 8 carbon atoms, such as 1,3-butadiene, isoprene, 2,3-dimethyl-1,3-butadiene, piperylene, or chloroprene.

The term "(meth)acrylic monomer", as employed in the present description, means a monomer chosen from the (meth)acrylates of formula

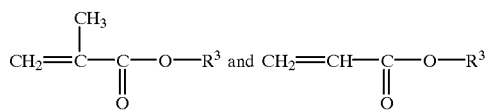

respectively, wherein $R^3$ is chosen from linear or branched, primary, secondary or tertiary, $C_1$–$C_{18}$ alkyl, $C_5$–$C_{18}$, cycloalkyl, $C_1$–$C_{18}$ ($C_1$–$C_{18}$ alkoxy)alkyl, $C_1$–$C_{18}$ ($C_1$–$C_{18}$ alkylthio)alkyl, aryl and arylalkyl radicals, with these radicals optionally being substituted by at least one halogen atom and/or at least one hydroxyl group, after protection of this hydroxyl group, the above alkyl groups being linear or branched;

glycidyl, norbornyl, isobornyl (meth)acrylates, methacrylonitrile or mono- and di ($C_1$–$C_{18}$ alkyl) (meth)acrylamides.

Mention may be made, as examples of methacrylates of the above formula, of methyl, ethyl, 2,2,2-trifluoroethyl, n-propyl, isopropyl, n-butyl, sec-butyl, tert.-butyl, n-amyl, i-amyl, n-hexyl, 2-ethylhexyl, cyclohexyl, octyl, i-octyl, nonyl, decyl, lauryl, stearyl, phenyl, benzyl, β-hydroxyethyl, hydroxypropyl or hydroxybutyl methacrylates. The preferred methacrylic monomer is methyl methacrylate.

Mention may be made, as examples of acrylates of the above formula, of methyl, ethyl, n-propyl, isopropyl, n-butyl, sec-butyl, tert.-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl and ethoxyethyl acrylates.

If the symbols used for the reactions (1) to (4) above are taken and if the stable free radical is represented by E., according to the invention results, during the polymerization process, the formation of linkages can be represented by $A(X)_nE$, with n being a non-zero integer. During polymerization, the polymer chain grows by insertion of monomer units between the chain ends A and E. Different monomer units can be introduced between A and E in a random or sequential manner. Thus, X represents one or more monomer units which can be different in nature.

Depending on the nature of the monomer unit, the nature of the iniferter and the temperature, it is possible to insert the monomer unit:

either by breaking the A—X bond of the polymer chain, with a new A—X bond being immediately reformed after insertion of the unit between A. and the new monomer unit, or by breaking the X—E bond of the polymer chain, with a new X—E bond being immediately reformed after insertion of the unit between E. and the new monomer unit.

The insertion of monomer units via the A—X bond is in particular possible when this bond is reversible under the effect of light, and particularly, of ultraviolet radiation. Such behavior can be observed when the iniferter used comprises two sulphur atoms at the single covalent bond as indicated in the reaction (1). In this case, the monomer unit insertion can take place between the S—X bond, generally when the temperature is between –30° C. and 200° C. In this case, the sulphur atom S belongs to the A radical. Thus, the process according to the present invention can comprise at least one stage of polymerization or copolymerization by the photochemical route. If only the photochemical reaction of polymerization or copolymerization is desired to take place in the mixture, it is advisable to choose conditions which prevent the other polymerization or copolymerization reactions generally observed when the temperature ranges from –30° C. to 60° C.

The process according to the present invention can also comprise at least one stage of polymerization or copolymerization by the thermal route involving the X—E bond.

If it is desired that the polymerization or copolymerization should take place predominantly via the X—E bond, it is advisable to choose conditions which prevent other polymerization or copolymerization reactions, which is generally observed as follows:

in the absence of light, wherein the A—X bond is reversible under the effect of light; and in the absence or presence of light, wherein the A—X bond is not reversible under the effect of light; and at the temperature that is sufficient, and not high enough for the spontaneous polymerization or copolymerization of the monomer, without involving the structure $A—(X)_n—E$, to become predominant.

For the case where X is a vinylaromatic monomer unit, these conditions exist when the temperature of the mixture is between 100 and 130° C. Polymerization or copolymerization at higher temperatures, for example, up to 200° C., is not ruled out, if a higher rate of polymerization is preferred at the expense of the polydispersity. The polymerization or copolymerization mixture can result in an impact vinylaromatic polymer, wherein it generally comprises at least one vinylaromatic monomer and a rubber, with the latter generally being a conjugated polydiene, such as one or more polybutadienes.

For the case where X is a diene unit, these conditions exist when the temperature of the mixture is between 100° C. and 200° C.

The insertion of monomer units via the X—E bond is particularly recommended for vinylaromatic monomers and dienes.

The insertion of monomer units via the A—X bond, that is to say via the photochemical route, is particularly recommended for (meth)acrylic monomers and more particularly for methacrylic monomers. This is an essential advantage of the invention with respect to the prior art as represented by WO 94/11412, which only provides a thermal route and is not suited to the polymerization or copolymerization of methacrylic monomers.

The process according to the present invention makes it possible the preparation of block copolymers. The choice may be made, depending on the nature of the monomers, to insert the blocks either by the photochemical route via the A—X bond, if the latter allows it, or by the thermal route via the E—X bond. Of course, it is possible to insert several blocks of different nature by the thermal route and several blocks of different nature by the photochemical route. Thus, the structure $A(X)_nE$ offers great flexibility of use and makes it possible by simple process of implementation the preparation of block (or sequential) copolymers with a complex structure.

The process according to the present invention is particularly suited to polymerization or copolymerization in the organic phase, in the absence of aqueous phase, as the case is in bulk processes or solution processes in an organic solvent.

Of course, depending on the polymerization or copolymerization conditions, and in particular the duration, the temperature and the degree of conversion of monomer to polymer or copolymer, it is possible to prepare products of very different molecular mass.

The invention relates both to the preparation of oligomers, polymers or copolymers with a weight-average molecular mass of less than 10,000, and to that of polymers or copolymers with a weight-average molecular mass greater than 10,000, such as high polymers with a weight-average molecular mass generally ranging from 100,000 to 400,000. Weight-average molecular masses of greater than 10,000 are obtained when the polymerization or copolymerization temperature and duration are sufficient.

The invention relates both to polymerization or copolymerization processes in which the degree of conversion of monomer to polymer or copolymer is less than 50% and to those in which the degree of conversion of monomer to polymer or copolymer is greater than 50%. For example, the degree of conversion of monomer to polymer or copolymer can exceed 60%.

The following characteristics have been used for the examples:
- % of conversion: % of monomer converted to polymer. It has been determined by $^1$H NMR on a Bruker 200 MHz device with integration of the peaks corresponding to the polymer and to the monomer.
- Number-average molecular mass (represented by Mn): Gel permeation chromatography (GPC) in THF at 30° C., after calibration with standard polystyrene samples.
- Polydispersity index (represented by Pi): ratio of the weight-average molecular mass to the number-average molecular mass, both measured by GPC (see Mn above).

EXAMPLES 1 TO 8

The following are introduced, at room temperature, into a 50 ml, glass, round-bottomed flask under a nitrogen atmosphere, the round-bottomed flask being equipped with magnetic bar stirring and a temperature regulation system:
- 50 g of styrene (0.481 mol, i.e. 8.7 mol per liter), then
- x mol per liter of di-tert-butyl nitroxide,
- y mol per liter of tetraethylthiuram disulphide.

The reactor is then brought to 120° C. with stirring. The instant at which the mixture reaches the temperature of 120° C. is defined as being the starting point of the test. The results are collated in Table 1 according to x and y and the duration of the polymerization.

TABLE 1

| Example No. | x (mol/liter) | y (mol/liter) | Time (h) | Yield (%) | Mn | Pi | Molecular mass distribution |
|---|---|---|---|---|---|---|---|
| 1 (comparative) | 0 | 0 | 0.25 | 90 | 65,000 | 5 | monomodal |
| 2 (comparative) | 0.01 | 0 | 10 | 6 | 4000 | 1.2 | monomodal |
|  |  |  | 23 | 35 | 11,000 | 1.5 |  |
|  |  |  | 48 | 90 | 23,000 | 1.8 |  |
| 3 (comparative) | 0.02 | 0 | 23 | 22 | 6500 | 1.5 | monomodal |
| 4 (comparative) | 0.05 | 0 | 23 | 18 | 4500 | 1.4 | monomodal |
| 5 (comparative) | 0 | 0.01 | 10 | 82 | 30,500 | 5.4 | bimodal |
|  |  |  | 23 | 90 | 30,000 | 5.5 |  |
| 6 (comparative) | 0 | 0.03 | 10 | 87 | 15,200 | 6.8 | bimodal |
|  |  |  | 23 | 92 | 14,500 | 7.0 |  |
| 7 | 0.02 | 0.01 | 10 | 40 | 11,200 | 1.5 | monomodal |
|  |  |  | 23 | 80 | 28,000 | 1.5 |  |
| 8 | 0.03 | 0.01 | 10 | 25 | 13,500 | 1.5 | monomodal |
|  |  |  | 23 | 70 | 40,000 | 1.5 |  |

EXAMPLE 9 a) Formation of a Polystyrene Block

The following are placed under argon and at room temperature in a 50 ml, glass, round-bottomed flask equipped with a magnetic bar:
- 10 g of styrene ($9.6 \times 10^{-2}$ mol),
- 0.144 g of di-tert-butyl nitroxide ($1 \times 10^{-3}$ mol),
- -0.15 g of tetraethylthiuram disulphide ($5 \times 10^{-4}$ mol), The temperature of the round-bottomed flask is then brought to 120° C. for 20 hours with stirring and then the reaction mixture is brought back to room temperature.

The polystyrene obtained is precipitated from ethanol for analysis. 8.4 g of polystyrene are obtained, which exhibits an Mn of 37,000 and a Pi of 1.6.

b) Formation of a Copolymer Comprising a Polystyrene Block and a Poly(methyl methacrylate) Block 0.5 g of the polystyrene prepared in a) is dissolved in 2 g of methyl methacrylate (MMA) in a glass tube under argon. The reaction mixture is placed at approximately 15 cm from a UV lamp, trademark Philips HPK 125 W 4A, for 6 hours at 30° C. The copolymer obtained is precipitated from methanol. 2.1 g of copolymer were obtained. No precipitate is formed on attempting to reprecipitate the copolymer from $CCl_4$, which shows the absence of poly(methyl methacrylate) homopolymer. The copolymer obtained exhibits an Mn of 120,000 and a Pi of 2.3.

EXAMPLE 10 (COMPARATIVE)

1 g of the polystyrene prepared in Example 9a) is dissolved in 5 g of methyl methacrylate in a glass reactor. The mixture, after having been placed under an inert atmosphere, is heated at 120° C. for 70 hours in a closed vessel with light excluded. After precipitation from methanol, it is found, by GPC and $^1$H NMR, that no polymerization or copolymerization took place during the heating for 70 hours with light excluded.

EXAMPLE 11 (COMPARATIVE)

The procedure is as for Example 9, except that tetraethylthiuram disulphide is replaced by the same mole number of benzoyl peroxide (0.12 g).

It is found that no polymerization or copolymerization took place during the stage b).

EXAMPLE 12 (COMPARATIVE)

The procedure is as for Example 11, except that no UV is used and except that the reaction mixture is heated for 6 hours at 130° C. during the stage b). It is found that no polymerization or copolymerization took place during the stage b).

We claim:

1. Process comprising at least one stage of polymerization or copolymerization of at least one monomer which can be polymerized or copolymerized by the radical route in the presence of a stable free radical and of an iniferter, wherein the stable free radical comprises the group =N—O and the iniferter can be represented by the formula

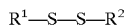

$R^1$—S—S—$R^2$ wherein the $R^1$ and $R^2$ groups, which can be identical or different, represent radicals comprising at least one carbon atom.

2. Process according to claim 1, characterized in that the iniferter can split into two free radicals under the effect of ultraviolet radiation.

3. Process according to claim 1, characterized in that it comprises at least one stage of polymerization or copolymerization by the photochemical route.

4. Process according to claim 1, characterized in that the stage by the photochemical route is carried out at a temperature ranging from −30 to 60° C.

5. Process according to claim 1, characterized in that it comprises at least one stage of polymerization or copolymerization by the thermal route.

6. Process according to claim 1, characterized in that the degree of conversion of monomer to polymer or copolymer is greater than 50%.

7. Process according to claim 1, characterized in that the temperature and the duration are sufficient to obtain a polymer or copolymer with a weight-average molecular mass of greater than 10,000.

8. Process according to claim 1, characterized in that the molar ratio of the stable free radical to the iniferter ranges from 0.2 to 5 and in a more preferred way from 0.5 to 3.

9. Process according to claim 1, characterized in that $R^1$ and $R^2$ are chosen from alkyl, aryl, aralkyl, alkylaryl, thiuram, xanthate and carbamoyl radicals.

10. Process according to claim 9, characterized in that the iniferter is tetraethylthiuram disulphide or tetramethylthiuram disulphide.

11. Process according to claim 1, characterized in that the iniferter is introduced into the polymerization or copolymerization mixture in the proportion of 0.001 mol % to 15 mol % of the sum of the number of moles of monomer and iniferter.

12. Process according to claim 1, characterized in that at least one monomer is a vinylaromatic monomer.

13. Process according to claim 1, characterized in that at least one monomer is a diene.

14. Process according to claim 1, characterized in that at least one monomer is chosen from acrylates or methacrylates.

* * * * *